(12) United States Patent
Mostoller et al.

(10) Patent No.: US 10,627,090 B2
(45) Date of Patent: Apr. 21, 2020

(54) POWER CONTACTS FOR A LIGHT SENSOR ASSEMBLY

(71) Applicant: TE CONNECTIVITY CORPORATION, Berwyn, PA (US)

(72) Inventors: Matthew Edward Mostoller, Hummelstown, PA (US); Christopher George Daily, Harrisburg, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 166 days.

(21) Appl. No.: 15/827,415

(22) Filed: Nov. 30, 2017

(65) Prior Publication Data

US 2019/0162400 A1    May 30, 2019

(51) Int. Cl.
| | | |
|---|---|---|
| *F21V 23/04* | (2006.01) | |
| *G01J 1/02* | (2006.01) | |
| *G01D 11/24* | (2006.01) | |
| *G01J 1/04* | (2006.01) | |
| *G01J 1/42* | (2006.01) | |
| *H01R 33/945* | (2006.01) | |
| *F21V 23/06* | (2006.01) | |

(Continued)

(52) U.S. Cl.
CPC ......... *F21V 23/0464* (2013.01); *F21S 8/086* (2013.01); *F21V 23/06* (2013.01); *G01D 11/245* (2013.01); *G01J 1/0266* (2013.01); *G01J 1/0271* (2013.01); *G01J 1/0448* (2013.01); *G01J 1/4228* (2013.01); *H01R 31/08* (2013.01); *H01R 33/9456* (2013.01); *F21W 2131/103* (2013.01); *G01J 2001/4266* (2013.01); *H01R 13/41* (2013.01); *H01R 24/005* (2013.01)

(58) Field of Classification Search
CPC ...... F21V 23/0464; F21V 23/06; F21S 8/086; H01R 33/9456; H01R 31/08; H01R 24/005; H01R 13/41; G01J 1/0266; G01J 1/4228; G01J 1/0448; G01J 1/0271; G01J 2001/4266; G01D 11/245; F21W 2131/103
See application file for complete search history.

(56) References Cited

U.S. PATENT DOCUMENTS

| 5,116,241 A | 5/1992 | Sato | |
|---|---|---|---|
| 2013/0044444 A1* | 2/2013 | Creighton | G01J 1/0271 361/752 |

FOREIGN PATENT DOCUMENTS

| JP | S59 17581 U | 2/1984 |
|---|---|---|
| WO | 2014/028144 A2 | 2/2014 |

OTHER PUBLICATIONS

International Search Report, International Application No. PCT/IB2018/058964, Internatonal Filing Date, Nov. 14, 2018.

* cited by examiner

*Primary Examiner* — Tony Ko (57) ABSTRACT

A light sensor assembly includes a sensor connector having a housing including a top and a bottom with power contact channels in the bottom of the housing. The sensor connector includes a circuit board supported by the housing at the top having a sensor component electrically connected to the circuit board sensing an environmental characteristic exterior of the sensor connector. The sensor connector includes power contacts received in corresponding contact channels and extending from the bottom for electrical connection with receptacle power contacts of the receptacle connector. The power contacts include a neutral power contact, a line power contact and a load power contact, where the line power (Continued)

contact and the load power contact are integral as a unitary contact body forming a monolithic line-load power contact.

20 Claims, 4 Drawing Sheets (51) Int. Cl.
*F21S 8/08* (2006.01)
*H01R 31/08* (2006.01)
*F21W 131/103* (2006.01)
*H01R 13/41* (2006.01)
*H01R 24/00* (2011.01)

POWER CONTACTS FOR A LIGHT SENSOR ASSEMBLY

BACKGROUND OF THE INVENTION

The subject matter herein relates generally to power contacts for light sensor assemblies.

On outdoor lighting, notably street lights and parking lot lights, sensor components and the corresponding mating receptacles are typically used to turn the lights on and off based upon the ambient light from the sun. Some light fixtures support dimming to variably control the light fixture based on the ambient light levels, time of day. There is a trend to provide programmable functions to the light fixtures based on sensors and programmable controls other than ambient light, such as, detected nearby pedestrian motion. To accommodate these functions, the lighting control receptacles provide low voltage control lines in addition to the high voltage power contacts. Some light sensor assemblies provide switching and light control separate from the high voltage power contacts. Such light sensor assemblies electrically short the line power contact and the load power contact using a separate shorting bar that is welded between the line power contact and the load power contact in the sensor connector. The shorting bar needs to be positioned a certain distance from other components in the sensor connector, such as the low voltage control contacts and the circuit board and associated components to prevent damage to such components. Such sensor connectors are typically made larger to provide additional spacing between the components and spacing for electrical isolation. Additionally, the assembly of the shorting bar in the field is time consuming. Furthermore, the welding is a place of potential failure over the life of the light sensor assembly.

A need remains for a light sensor assembly having electrical shorting that may be manufactured in a cost effective and reliable manner.

BRIEF DESCRIPTION OF THE INVENTION

In one embodiment, a light sensor assembly is provided including a sensor connector configured to be coupled to a receptacle connector mounted to a light fixture. The sensor connector includes a housing having a top and a bottom defining a mating interface configured to be mated to the receptacle connector. The housing includes power contact channels in the bottom of the housing. The sensor connector includes a circuit board supported by the housing at the top having a sensor component electrically connected to the circuit board sensing an environmental characteristic exterior of the sensor connector. The sensor connector includes power contacts received in corresponding contact channels and extending from the bottom for electrical connection with receptacle power contacts of the receptacle connector. The power contacts include a neutral power contact, a line power contact and a load power contact, where the line power contact and the load power contact are integral as a unitary contact body forming a monolithic line-load power contact.

In another embodiment, a light sensor assembly is provided including a receptacle connector configured to be mounted to a housing of a light fixture having a mating interface. The receptacle connector holds receptacle power contacts at the mating interface configured to be electrically connected to power wires of the light fixture for powering the light fixture. The light sensor assembly includes a sensor connector having a housing mated to the receptacle connector at the mating interface. The sensor connector has power contacts being electrically connected to the receptacle power contacts of the receptacle connector. The sensor connector has a sensor component sensing an environmental characteristic exterior of the sensor connector. The power contacts include a neutral power contact, a line power contact and a load power contact, where the line power contact and the load power contact are integral as a unitary contact body.

In a further embodiment, a light sensor assembly is provided including a sensor connector configured to be coupled to a receptacle connector mounted to a light fixture. The sensor connector includes a housing having a top and a bottom defining a mating interface configured to be mated to the receptacle connector. The housing has a base wall including enclosed power contact channels open at the bottom of the housing and closed at the top of the housing. The sensor connector includes a circuit board supported by the housing at the top. The circuit board is separated from the power contact channels by the base wall. The circuit board has a sensor component electrically connected to the circuit board sensing an environmental characteristic exterior of the sensor connector. The sensor connector includes power contacts received in corresponding contact channels and being isolated from the circuit board by the base wall. The power contacts extend from the bottom for electrical connection with receptacle power contacts of the receptacle connector. The power contacts include a neutral power contact, a line power contact and a load power contact, where the line power contact and the load power contact are integral as a unitary contact body.

DETAILED DESCRIPTION OF THE INVENTION

Figure 1:
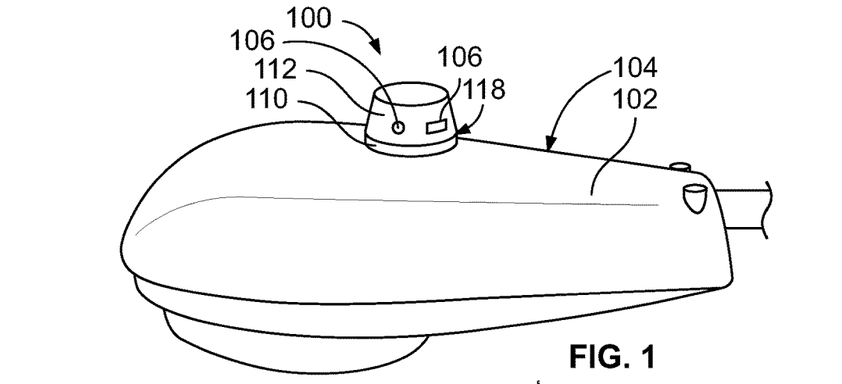
FIG. 1 illustrates a light sensor assembly formed in accordance with an exemplary embodiment.

FIG. 1 illustrates a light sensor assembly 100 formed in accordance with an exemplary embodiment. The light sensor assembly 100 is mounted to a housing 102, such as a housing of a light fixture 104, such as a roadway light, a parking lot light, a street light, and the like, or to another component, such as the pole or other structure supporting the light fixture 104, or to another component unassociated with the light fixture, such as a parking meter, a telephone pole or another structure. The light sensor assembly 100 holds one or more sensors or sensor components 106 that may be used for environmental monitoring or to control the light fixture 104, such as for turning the light fixture on or off depending upon light levels, for dimming control of the light fixture, or for controlling other functions. The sensor components 106 may be used for other functions other than controlling the light fixture 104, such as remote monitoring of the environmental surroundings of the housing 102, such as for parking monitoring, for street flow activity monitoring, or other functions. The sensor components 106 may be a photocell or light sensor used to detect ambient light from the sun. Other types of sensor components 106 such as object identification sensors, motion sensors, timing sensors or other types of environmental sensors may be included in the light sensor assembly 100.

The light sensor assembly 100 includes a receptacle connector 110 that forms the bottom of the assembly 100. The receptacle connector 110 may be directly mounted to the housing 102 of the light fixture 104 or may be mounted to another component on the housing 102. The light sensor assembly 100 includes a sensor connector 112 coupled to the receptacle connector 110. The sensor connector 112 houses or surrounds the sensor component 106, such as to provide environmental protection for the sensor component 106. In an exemplary embodiment, the receptacle connector 110 is a twist-lock photocontrol receptacle connector and the sensor connector 112 is a twist-lock photocontrol sensor connector, such as connectors being ANSI C136.x compliant. The connectors 110, 112 include contacts 114, 116 (shown in FIG. 2), respectively, at a mating interface 118. For example, the contacts 114, 116 may be twist-lock contacts. The contacts 114, 116 may be high voltage power contacts. Other types of contacts may be provided at the mating interface for a direct, physical electrical connection across the mating interface 118 between the connectors 110, 112. The connectors 110, 112 may be other types of connectors other than twist-lock connectors. The connectors 110, 112 may include other types of contacts 114, 116 other than twist-lock contacts or may not include any contacts but rather be contactless connectors.

In an exemplary embodiment, the receptacle connector 110 includes receptacle signal contacts 120 and the sensor connector 112 includes signal contacts 122 for data communication between the receptacle connector 110 and the sensor connector 112. Data may be transmitted from the sensor connector 112 to the receptacle connector 110, or vice versa, across the mating interface 118. For example, control signals may be transmitted from the sensor connector 112 to the receptacle connector 110 for controlling operation of the light fixture 104. The control signals may be based on sensor data gathered by the sensor component 106.

Figure 2:
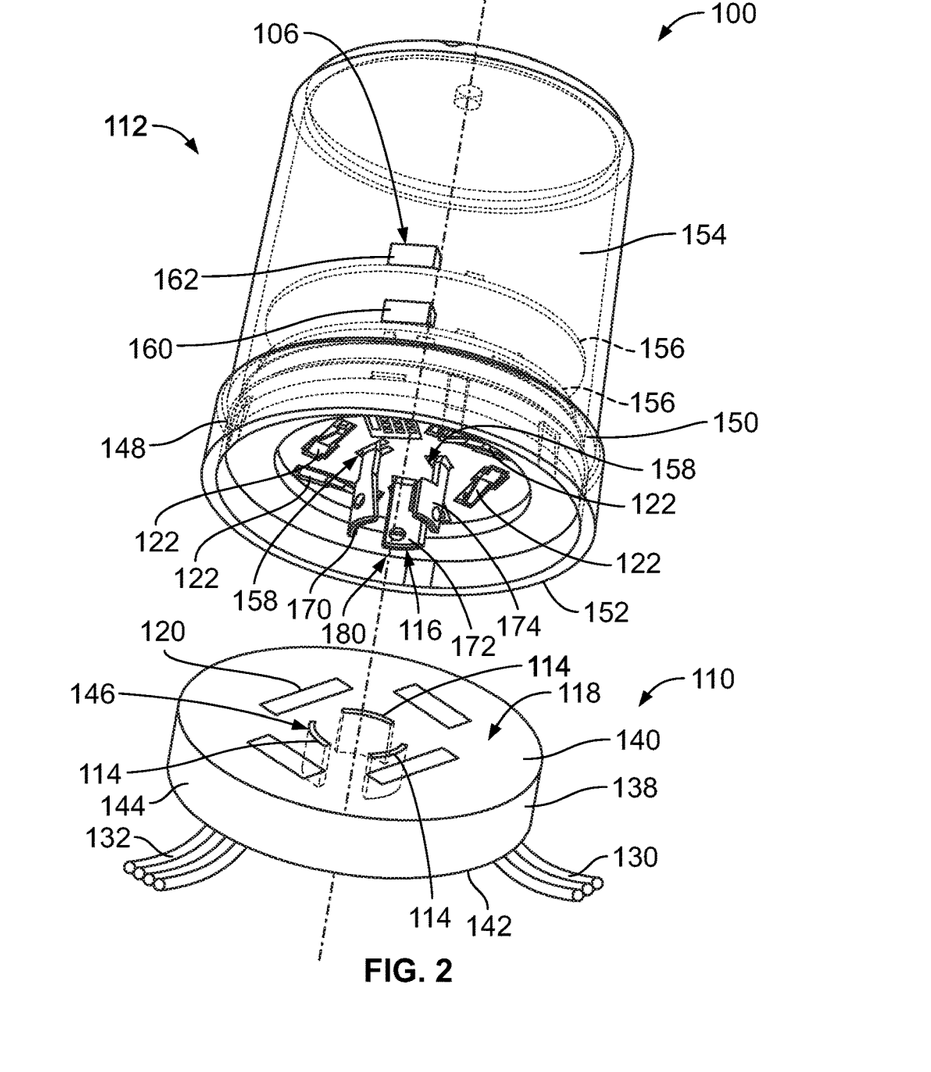
FIG. 2 is a schematic view of the light sensor assembly formed in accordance with an exemplary embodiment showing a sensor connector and a receptacle connector.

FIG. 2 is a schematic view of the light sensor assembly 100 formed in accordance with an exemplary embodiment showing the sensor connector 112 poised for mating with the receptacle connector 110. The connectors 110, 112 hold the power contacts 114, 116 and the signal contacts 120, 122. Optionally, a seal (not shown) may be provided between the receptacle connector 110 and the sensor connector 112 to seal the light sensor assembly 100 at the mating interface 118 from environmental containments such as water, debris, and the like.

The light sensor assembly 100 may include power wires 130 extending from the receptacle connector 110. The power wires 130 are terminated to corresponding receptacle power contacts 114. The power wires 130 may be power in or power out wires bringing power to the light sensor assembly 100 from a power source or bringing power from the power contacts 114 to another component, such as the light or a driver board for the light of the light fixture 104. In various embodiments, the power wires 130 may include a line wire, a load wire, a neutral wire or other types of wires. In other various embodiments, the light sensor assembly 100 does not include the power wires 130 extending to/from the receptacle connector 110, but rather the power wires 130 may extend to other components in the light fixture 104.

The light sensor assembly 100 may additionally or alternatively include signal wires 132 extending from the receptacle connector 110. The signal wires 132 may be electrically connected to the receptacle signal contacts 120. The signal wires 132 may be electrically connected to other components, such as a control module or driver board of the light fixture 104. The signal wires 132 may transmit data to or from the receptacle connector 110 for data communication with the sensor connector 112. The signal contacts 120, 122 are directly mated together at the mating interface 118.

The receptacle connector 110 includes a housing 138 extending between a top 140 and a bottom 142 opposite the top 140. The bottom 142 is configured to be secured to the fixture housing 102 or another component. The receptacle connector 110 includes a side wall 144 between the top 140 and the bottom 142. The housing 138 holds the power contacts 114 and the signal contacts 120. Optionally, such components may be entirely contained within the housing 138 and protected from the environment by the housing 138. For example, the power contacts 114 may be held in contact channels 146 within the housing 138. Optionally, the contact channels 146 are curved slots or openings in the housing 138 extending between the top 140 and the bottom 142. In an exemplary embodiment, the receptacle connector 110 is cylindrical shaped, such as to allow easy rotation of the sensor connector 112 relative to the receptacle connector 110. However, the receptacle connector 110 may have other shapes and alternative embodiments.

In an exemplary embodiment, the receptacle connector 110 includes at least one securing feature used to secure the sensor connector 112 relative to the receptacle connector 110. For example, the receptacle connector 110 may include a clip or a flange to secure the sensor connector 112 to the receptacle connector 110. The securing feature may allow rotation of the sensor connector 112 relative to the receptacle connector 110 when engaged. Other fastening methods that secure sensor connector 112 to the receptacle connector 110 may be employed, which may allow rotation of sensor connector 112 relative to receptacle connector 110. In other various embodiments, the interaction between the power contacts 114, 116 is used to secure the sensor connector 112 to the receptacle connector 110.

The sensor connector 112 includes a housing 148 extending between a top 150 and a bottom 152 opposite the top 150. The bottom 152 may define the mating interface and is configured to be secured to the receptacle connector 110. In other embodiments, sides of the housing 148 or other securing features may be secured to the receptacle connector 110. In an exemplary embodiment, the sensor connector 112 includes a sensor lid 154 at the top 150 of the housing 148. The sensor lid 154 may be rotatably coupled to the housing 148, such as to allow positioning of the photocell 106 relative to the light fixture 104 (e.g., to direct the photocell in a north direction to receive diffuse ambient light). In other various embodiments, the photocell may be provided at the top 150 such that rotation of the sensor lid 154 is unnecessary. In an exemplary embodiment, the receptacle connector 110 is cylindrical shaped, such as to allow easy rotation of the sensor connector 112 relative to the receptacle connector 110, such as during mating. However, the receptacle connector 110 may have other shapes and alternative embodiments.

The housing 148 holds the power contacts 116 and the signal contacts 122. For example, the power contacts 116 may be held in contact channels 158 within the housing 148. Optionally, the contact channels 158 are curved slots or openings in the housing 148. The housing 148 may hold the sensor(s) 106. In an exemplary embodiment, the housing 148 holds a circuit board 156 and various components are mounted to the circuit board 156. For example, the power contacts 116 and the signal contacts 122 may be mounted to the circuit board 156. The sensor components 106 may be mounted to the circuit board 156. A control module and/or communication device may be mounted to the circuit board 156. The power contacts 116 and the signal contacts 122 may extend from the bottom 152 for mating with the receptacle power contacts 114 and the receptacle signal contacts 120, respectively, of the receptacle connector 110 and may be arranged generally around a central axis, however the power contacts 114 and/or the signal contacts 122 may be at different locations in alternative embodiments. Optionally, the power contacts 116 may be curved and fit in the curved contact channels 146 in the receptacle connector 110 to mate with corresponding curved receptacle power contacts 114. In an exemplary embodiment, the sensor connector 112 may be twisted or rotated to lock the power contacts 116 in the receptacle connector 110, such as in electrical contact with the receptacle power contacts 114. For example, the power contacts 116 may be twist-lock contacts that are initially loaded into the contact channels 146 in a vertical direction and the sensor connector 112 is then rotated, such as approximately 35 degrees, to lock the power contacts 116 in the receptacle connector 110. Other types of mating arrangements between the power contacts 116 and the receptacle connector 110 are possible in alternative embodiments.

In an exemplary embodiment, the sensor connector 112 includes different types of environmental sensor components 106 for sensing different events. For example, the sensor connector 112 includes a photocell 160. The photocell 160 is used for sensing ambient light and is used to control operation of the light fixture 104, such as for turning the light fixture 104 on or off depending upon light levels or for dimming control of the light fixture 104. Optionally, the photocell 160 may be mounted to the circuit board 156. Alternatively, the photocell 160 may be mounted in the sensor lid 154 and aim-able by rotating the sensor lid 154 relative to the housing 148. In other various embodiments, the photocell 160 may be mounted to the sensor lid 154 and connected to the circuit board 156 by one or more wires or contacts. The signal contacts 120 and the photocell 160 may be electrically connected via the circuit board 156. The circuit board 156 may include additional componentry for signal conditioning. For example, the circuit board 156 may have control circuitry for controlling operation of the light fixture 104, such as including a daylight or nighttime control circuit, a timer circuit, a dimming circuit, and the like. Data from the photocell 160 may be transmitted through the signal contacts 120, 122 across the mating interface 118.

In an exemplary embodiment, the sensor connector 112 includes one or more environmental sensors 162 for sensing an environmental characteristic other than ambient light exterior of the sensor connector 112 in the environment exterior of the sensor connector 112. For example, the sensor 162 may be a motion sensor or an object sensor configured to sense movement or presence of an object, such as a person or vehicle in a particular area. The sensor 162 may be used for parking monitoring, for street flow activity monitoring, for pedestrian monitoring, or other functions. The sensor 162 may be mounted to the circuit board 156. In an exemplary embodiment, the sensor 162 is electrically connected to the sensor contacts 122 via the circuit board 156.

In an exemplary embodiment, the sensor connector 112 includes three power contacts 116 representing a neutral power contact 170, a line power contact 172 and a load power contact 174. The neutral power contact 170 is configured to be connected to a neutral power wire 130 through the corresponding receptacle signal contact 114. The line power contact 172 is configured to be connected to a line power wire 130 through the corresponding receptacle power contact 114. The load power contact 172 is configured to be connected to a load power wire 130 through the corresponding receptacle power contact 114. The line power comes from a power source and the load power goes to the light fixture 104 for powering the light element of the light fixture 104. In an exemplary embodiment, the line power contact 172 and the load power contact 174 are integral as a unitary contact body forming a monolithic line-load power contact 180.

Figure 3:
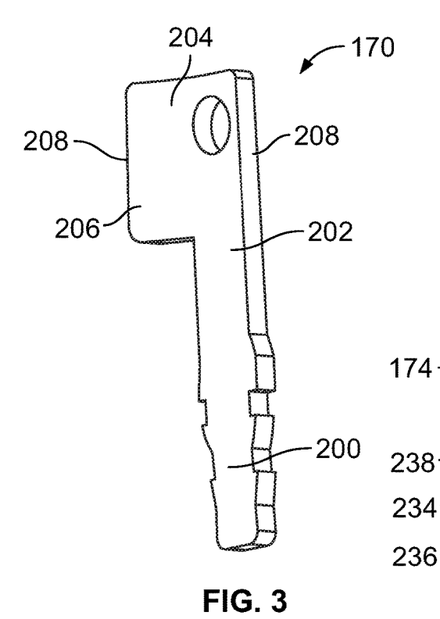
FIG. 3 is a perspective view of a power contact of the sensor connector in accordance with an exemplary embodiment.

FIG. 3 is a perspective view of the neutral power contact 170 in accordance with an exemplary embodiment. The neutral power contact 170 includes a base 200 defining the main body of the neutral power contact 170. The base 200 is configured to be secured in the housing 148 of the sensor connector 112. For example, the base 200 may include barbs along side edges thereof used to secure the neutral power contact 170 in the housing 148. The neutral power contact 170 includes a mating beam 202 extending from the base 200. The mating beam 202 includes a mating tab 204 at an end of the mating beam 202. The mating tab 204 is configured to be mated with the corresponding receptacle power contact 114. In an exemplary embodiment, the mating tab 204 defines a twist lock contact configured to be mated with the receptacle power contact 114 by a twist lock mating process. In an exemplary embodiment, the mating beam 202 and/or the mating tab 204 may have a curved profile. For example, sides 206 of the mating tab 204 may be curved between edges 208 thereof.

Figure 4:
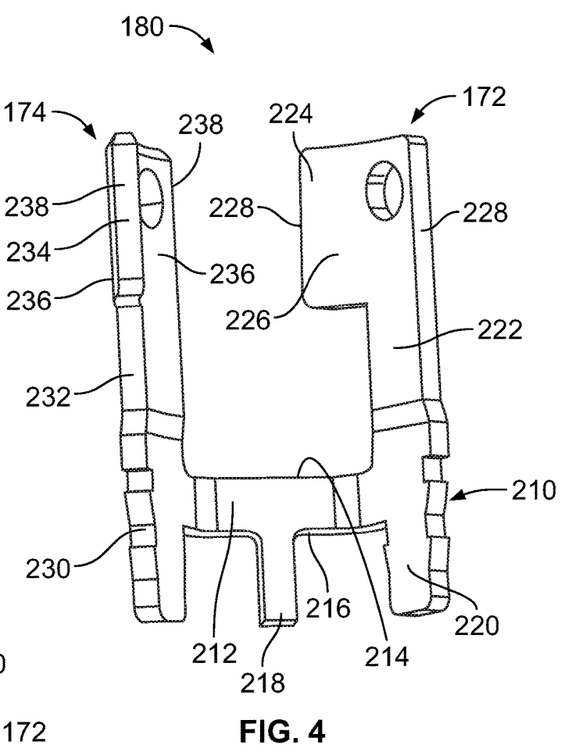
FIG. 4 is a perspective view of a power contact of the sensor connector in accordance with an exemplary embodiment.
Figure 5:
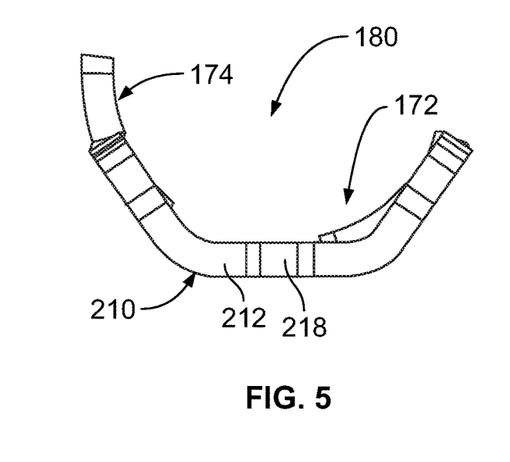
FIG. 5 is a bottom view of a power contact of the sensor connector in accordance with an exemplary embodiment.

FIG. 4 is a perspective view of the line-load power contact 180 in accordance with an exemplary embodiment. FIG. 5 is a bottom view of the line-load power contact 180 in accordance with an exemplary embodiment. The line-load power contact 180 includes a unitary contact body 210 including the line power contact 172 and the load power contact 174. A shorting beam 212 extends between the line power contact 172 and the load power contact 174. The shorting beam 212, the line power contact 172 and the load power contact 174 are integral parts of the unitary contact body 210. In an exemplary embodiment, the line-load power contact 180 is a stamped and formed power contact having the line power contact 172, the load power contact 174 and the shorting beam 212 stamped from a single piece of metal. As such, the line-load power contact 180 does not include any electrical interfaces between the line power contact 172 and the load power contact 174. Rather, the unitary contact body 210 is a single structure with the shorting beam 212 electrically connecting the line power contact 172 and the load power contact 174. A separate piece of metal is not used for shorting between the line power contact 172 and the load power contact 174. There are no welding interfaces between the line power contact 172 and the load power contact 174.

The shorting beam 212 includes an upper edge 214 and a lower edge 216. A locating beam 218 extends from the lower edge 216 and is used for locating the line-load power contact 180 in the housing 148 of the sensor connector 112. The shorting beam 212 is provided near the bottom of the line-load power contact 180 and is configured to be located in the corresponding contact channel 158 in the housing 148 of the sensor connector 112.

The line power contact 172 includes a base 220 configured to be secured in the housing 148 of the sensor connector 112. For example, the base 220 may include barbs along side edges thereof used to secure the line power contact 172 in the housing 148. The shorting beam 212 may extend from the base 220. The line power contact 172 includes a mating beam 222 extending from the base 220. The mating beam 222 includes a mating tab 224 at an end of the mating beam 222. The mating tab 224 is configured to be mated with the corresponding receptacle power contact 114. In an exemplary embodiment, the mating tab 224 defines a twist lock contact configured to be mated with the receptacle power contact 114 by a twist lock mating process. In an exemplary embodiment, the mating beam 222 and/or the mating tab 224 may have a curved profile. For example, sides 226 of the mating tab 224 may be curved between edges 228 thereof.

The load power contact 174 includes a base 230 configured to be secured in the housing 148 of the sensor connector 112. For example, the base 230 may include barbs along side edges thereof used to secure the load power contact 174 in the housing 148. The shorting beam 212 may extend from the base 230. The load power contact 174 includes a mating beam 232 extending from the base 230. The mating beam 232 includes a mating tab 234 at an end of the mating beam 232. The mating tab 234 is configured to be mated with the corresponding receptacle power contact 114. In an exemplary embodiment, the mating tab 234 defines a twist lock contact configured to be mated with the receptacle power contact 114 by a twist lock mating process. In an exemplary embodiment, the mating beam 232 and/or the mating tab 234 may have a curved profile. For example, sides 236 of the mating tab 234 may be curved between edges 238 thereof.

Figures 6, 7, 8:
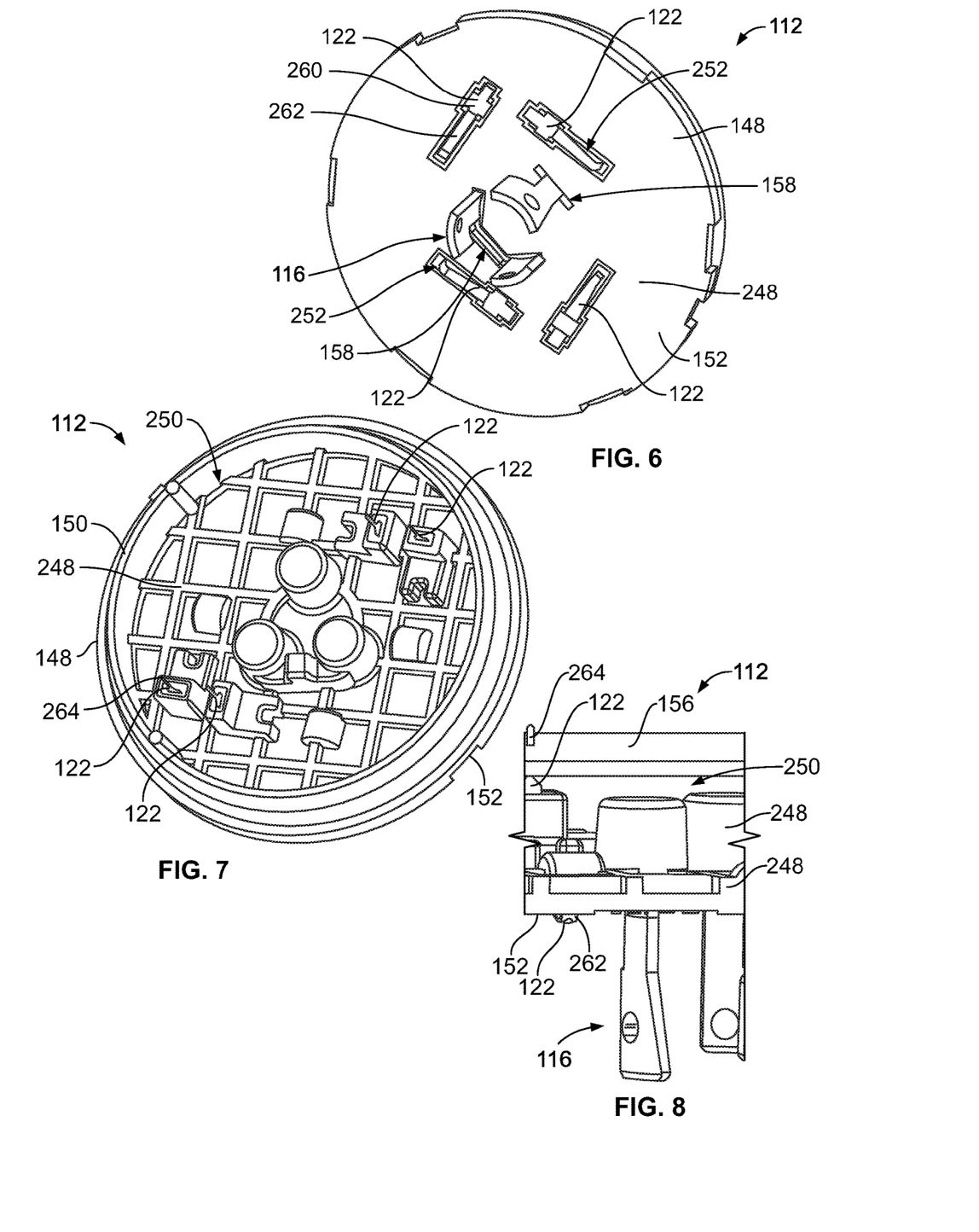
FIG. 6 is a bottom perspective view of a housing of the sensor connector in accordance with an exemplary embodiment.
FIG. 7 is a top perspective view of the housing of the sensor connector in accordance with an exemplary embodiment.
FIG. 8 is a partial sectional view of a portion of the sensor connector showing the housing and a circuit board in accordance with an exemplary embodiment.

FIG. 6 is a bottom perspective view of the housing 148 of the sensor connector 112 in accordance with an exemplary embodiment. FIG. 7 is a top perspective view of the housing 148 of the sensor connector 112 in accordance with an exemplary embodiment. FIG. 8 is a partial sectional view of a portion of the sensor connector 112 showing the housing 148 and the circuit board 156 at the top 150 of the housing 148.

In an exemplary embodiment, the housing 148 includes a base wall 248 at the bottom 152 defining the contact channels 158. The housing 148 includes a cavity 250 above the base wall 248 open at the top 150. The cavity 250 may receive more may be closed off by the circuit board 156. Components of the circuit board 156 may extend into the cavity 250. In an exemplary embodiment, the contact channels 158 are closed to the cavity 250 by the base wall 248. The contact channels 158 are closed from the top 150. As such, the power contacts 116 are not exposed or accessible from the top 150 in the cavity 250. The base wall 248 isolates the power contacts 116 from the circuit board 156.

The signal contacts 122 are coupled to the base wall 248 of the housing 148 in corresponding contact channels 252. The signal contacts 122 are exposed at the bottom 152 for mating with the receptacle signal contacts 120 of the receptacle connector 110. In an exemplary embodiment, each signal contact 122 includes a base 260 configured to be coupled to the base wall 248 of the housing 148. The signal contact 122 includes a mating end 262 extending from the base 260. Optionally, the mating end 262 may be a spring beam that is deflectable when mating with the receptacle signal contacts 120. Other types of mating beams may be provided in alternative embodiments. The signal contact 122 includes a board end 264 extending from the base 260 into the cavity 250. The board end 264 is configured to be terminated to the circuit board 156. For example, the board end 264 may be press-fit into the circuit board 156. In other embodiments, the board end 264 may be surface mounted to the circuit board 156, such as using solder or a deflectable spring beam. The signal contacts 122 are electrically isolated from the power contacts 116 by the dielectric material of the base wall 248. Having the contact channels 158 closed at the top isolates the power contacts 116 from the signal contacts 122.

Figure 9:
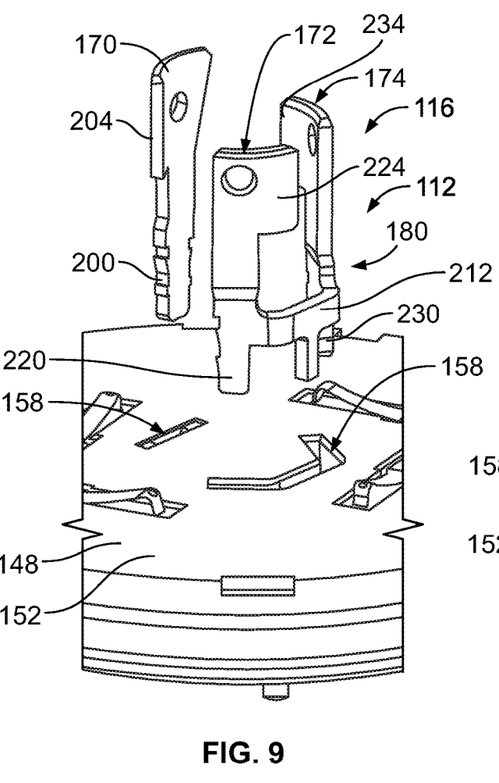
FIG. 9 is a bottom perspective view of a portion of the sensor connector showing power contacts poised for loading into the housing of the sensor connector in accordance with an exemplary embodiment.
Figure 10:
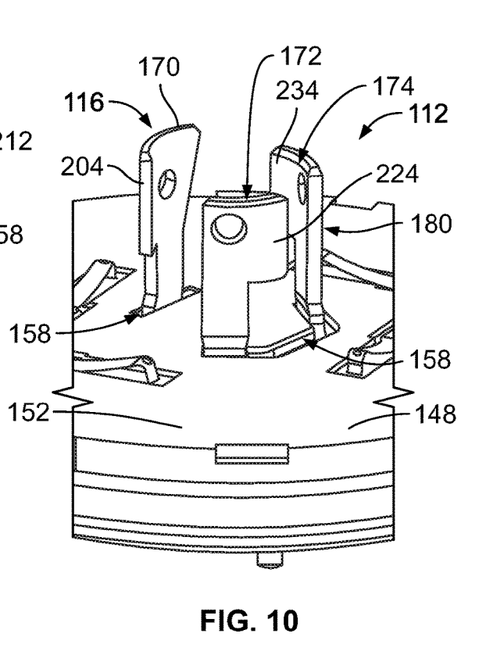
FIG. 10 is a bottom perspective view of a portion of the sensor connector showing the power contacts loaded into the housing of the sensor connector in accordance with an exemplary embodiment.
Figure 11:
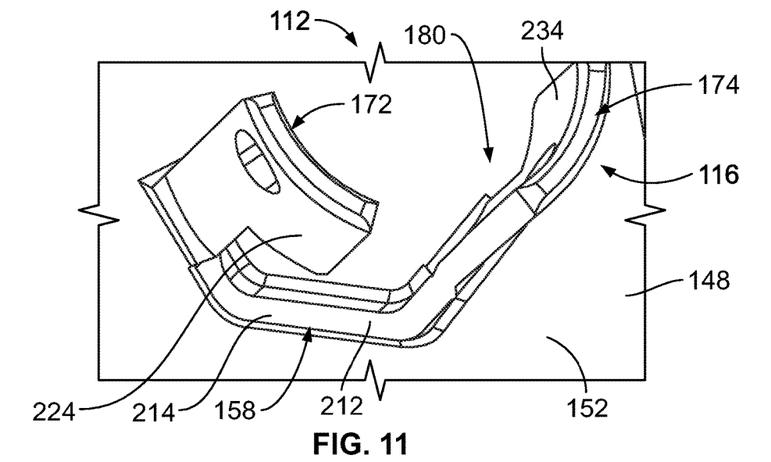
FIG. 11 is a bottom perspective view of a portion of the sensor connector showing one of the power contacts loaded into the housing of the sensor connector in accordance with an exemplary embodiment.

FIG. 9 is a bottom perspective view of a portion of the sensor connector 112 showing the power contacts 116 poised for loading into the housing 148 of the sensor connector 112. FIG. 10 is a bottom perspective view of a portion of the sensor connector 112 showing the power contacts 116 loaded into the housing 148 of the sensor connector 112. FIG. 11 is a bottom perspective view of a portion of the sensor connector 112 showing one of the power contacts 116 loaded into the corresponding contact channel 158 in the housing 148 of the sensor connector 112.

The power contacts 116 are coupled to the housing 148 in corresponding contact channels 158 and extend from the bottom 152 for mating with the receptacle connector 110. The bases 200, 220, 230 of the power contacts 116 are loaded into the corresponding contact channels 158 and secured therein using the barbs along the edges of the bases 200, 220, 230. Other securing means may be provided in alternative embodiments.

In the illustrated embodiment, the neutral power contact 170 is received in a single contact channel 158 and the line-load power contact 180 is received in a single contact channel 158 separate from the contact channel 158 receiving the neutral power contact 170. The contact channel 158 receiving the line-load power contact 180 is sized and shaped for receiving bases 220, 230 of the line power contact 172 and the load power contact 174, respectively. In an exemplary embodiment, the contact channel 158 is sized and shaped to receive the shorting beam 212. Optionally, the shorting beam 212 may be positioned in the contact channel 158 such that the upper edge 214 is flush with or recessed into the housing 148.

The line-load power contact 180 is coupled to the housing 148 such that the line power contact 172 and the load power contact 174 are positioned equidistant from the neutral power contact 170 and equidistant from each other. The neutral power contact 170, the line power contact 172 and the load power contact 174 form a ring around a center of the housing 148. The mating tabs 204, 224, 234 are positioned for twist lock mating with the corresponding receptacle power contacts 114 of the receptacle connector 110.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A light sensor assembly comprising:
   a sensor connector configured to be coupled to a receptacle connector mounted to a light fixture, the sensor connector comprising:
   a housing having a top and a bottom, the bottom defining a mating interface configured to be mated to the receptacle connector, the housing having power contact channels in the bottom of the housing;
   a circuit board supported by the housing at the top, the circuit board having a sensor component electrically connected to the circuit board, the sensor component sensing an environmental characteristic exterior of the sensor connector; and
   power contacts received in corresponding contact channels and extending from the bottom for electrical connection with receptacle power contacts of the receptacle connector, the power contacts including a neutral power contact, a line power contact and a load power contact, the line power contact and the load power contact being integral as a unitary contact body forming a monolithic line-load power contact, wherein the power contacts are twist-lock power contacts having curved profiles being rotatable to mated positions with the receptacle power contacts.

2. The light sensor assembly of claim 1, wherein the unitary contact body is a stamped and formed body.

3. The light sensor assembly of claim 1, wherein the line power contact and the load power contact are electrically connected without any electrical interfaces therebetween.

4. The light sensor assembly of claim 1, wherein the neutral power contact is separate and discrete from the line-load power contact.

5. The light sensor assembly of claim 1, wherein the neutral power contact is in a separate contact channel from the single contact channel holding the line-load power contact.

6. The light sensor assembly of claim 1, wherein the neutral power contact includes a neutral mating beam and the line-load power contact includes both a line mating beam and a load mating beam.

7. The light sensor assembly of claim 1, wherein the line-load power contact includes a shorting beam between a line mating beam and a load mating beam to electrically connect the line mating beam and the load mating beam, the line mating beam, the load mating beam and the shorting beam being parts of the unitary contact body.

8. The light sensor assembly of claim 1, wherein the neutral power contact includes a neutral mating beam, the line power contact includes a line mating beam and the load power contact includes a load mating beam, the line mating beam and the load mating beam being connected by a shorting beam integral with the unitary contact body, the neutral mating beam, the line mating beam and the load mating beam being positioned equidistant from each other.

9. The light sensor assembly of claim 8, wherein the neutral mating beam, the line mating beam and the load mating beam having curved profiles for twist-lock mating with the receptacle power contacts.

10. The light sensor assembly of claim 1, wherein the housing includes a base wall including the contact channels, the base wall closing the contact channels from the top, the base wall isolating the power contacts from the circuit board.

11. The light sensor assembly of claim 1, further comprising signal contacts held by the housing, the signal contacts having mating ends at the bottom of the housing configured for mating with receptacle signal contacts of the receptacle connector, the signal contacts having board ends terminated to the circuit board, the signal contact configured to transmit data signals between the sensor connector and the receptacle connector.

12. A light sensor assembly comprising:
    a receptacle connector configured to be mounted to a housing of a light fixture, the receptacle connector having a mating interface, the receptacle connector holding receptacle power contacts at the mating interface configured to be electrically connected to power wires of the light fixture for powering the light fixture; and
    a sensor connector having a housing mated to the receptacle connector at the mating interface, the sensor connector having power contacts being electrically connected to the receptacle power contacts of the receptacle connector, the sensor connector having a sensor component sensing an environmental characteristic exterior of the sensor connector, the power contacts including a neutral power contact, a line power contact and a load power contact, the line power contact and the load power contact being integral as a unitary contact body, wherein the power contacts are twist-lock power contacts having curved profiles being rotatable to mated positions with the receptacle power contacts.

13. The light sensor assembly of claim 12, wherein the unitary contact body is a stamped and formed body.

14. The light sensor assembly of claim 12, wherein the line power contact and the load power contact are electrically connected without any electrical interfaces therebetween.

15. The light sensor assembly of claim 12, wherein the unitary contact body forms a monolithic line-load power contact.

16. The light sensor assembly of claim 12, wherein the neutral power contact includes a neutral mating beam, the line power contact includes a line mating beam and the load power contact includes a load mating beam, the line mating beam and the load mating beam being joined by a shorting beam integral with the unitary contact body.

17. The light sensor assembly of claim 12, further comprising signal contacts held by the housing, the signal contacts having mating ends at the bottom of the housing configured for mating with receptacle signal contacts of the receptacle connector, the signal contacts having board ends terminated to the circuit board, the signal contact configured to transmit data signals between the sensor connector and the receptacle connector.

18. A light sensor assembly comprising:
a sensor connector configured to be coupled to a receptacle connector mounted to a light fixture, the sensor connector comprising:
a housing having a top and a bottom, the bottom defining a mating interface configured to be mated to the receptacle connector, the housing having a base wall including enclosed power contact channels open at the bottom of the housing and closed at the top of the housing;
a circuit board supported by the housing at the top, the circuit board being separated from the power contact channels by the base wall, the circuit board having a sensor component electrically connected to the circuit board, the sensor component sensing an environmental characteristic exterior of the sensor connector; and
power contacts received in corresponding contact channels and being isolated from the circuit board by the base wall, the power contacts extending from the bottom for electrical connection with receptacle power contacts of the receptacle connector, the power contacts including a neutral power contact, a line power contact and a load power contact, the line power contact and the load power contact being integral as a unitary contact body, wherein the power contacts are twist-lock power contacts having a curved profile being rotatable to mated positions with the receptacle power contacts.

19. The light sensor assembly of claim 18, wherein the line power contact and the load power contact are electrically connected without any electrical interfaces therebetween.

20. The light sensor assembly of claim 18, wherein the neutral power contact includes a neutral mating beam, the line power contact includes a line mating beam and the load power contact includes a load mating beam, the line mating beam and the load mating beam being joined by a shorting beam integral with the unitary contact body.

* * * * *